United States Patent

Van Dine

[15] 3,673,519

[45] June 27, 1972

[54] IMPEDANCE MATCHING TRANSFORMER FOR COUPLING TRANSMISSION LINES

[72] Inventor: Gilbert August Van Dine, Winfield Twp., Du Page County, Ill.

[73] Assignee: Bell Telephone Laboratories, Incorporated, Murray Hill, Berkeley Heights, N.J.

[22] Filed: Jan. 22, 1971

[21] Appl. No.: 108,803

[52] U.S. Cl. ....................333/6, 333/8, 333/32

[51] Int. Cl. ....................H03h 7/38, H03h 7/48

[58] Field of Search ....................333/6, 8, 32, 11; 336/150; 331/113 A

[56] References Cited

UNITED STATES PATENTS

| | | | |
|---|---|---|---|
| 3,503,016 | 3/1970 | Podell | 333/11 |
| 2,499,423 | 3/1950 | Selinger | 333/11 X |
| 3,213,346 | 10/1965 | King, Jr. | 333/113 D X |
| 3,484,727 | 12/1969 | Weber et al. | 336/150 X |
| 2,687,513 | 8/1954 | Lindenblad | 333/32 |
| 2,747,165 | 5/1956 | Fuller | 333/8 X |

*Primary Examiner*—Paul L. Gensler
*Attorney*—R. J. Guenther and R. B. Ardis

[57] ABSTRACT

A transformer circuit for tapping a branching line to a main two-wire transmission line comprising a primary winding having two end sections serially connected respectively in the two wires of the main line and a midsection connected across it. The secondary winding originates the branching line and is coupled to the entire primary winding.

13 Claims, 4 Drawing Figures

PATENTED JUN 27 1972 3,673,519

INVENTOR
G. A. VAN DINE
BY William H. Kamstra
ATTORNEY

IMPEDANCE MATCHING TRANSFORMER FOR COUPLING TRANSMISSION LINES

BACKGROUND OF THE INVENTION

This invention relates to electrical transmission lines and, more particularly, to circuit means adapted to provide branching couplings to such lines.

In complex electronic systems such as data processing and electronic telephone switching systems, for example, data and control information must be distributed from originating points to a multiplicity of functional units in the system. In one known telephone system such interconnections are provided via a bus system, each bus comprising a plurality of two-wire pairs along which suitable taps are provided for directing information signals to the unit to be controlled. In *The Bell System Technical Journal*, Vol. 43, September 1964, at page 2,046, such a telephone system is described in which the specific circuit employed to accomplish a branching tap of a two-wire pair is shown as comprising a transformer having two primary windings, one serially inserted in each of the two wires, the secondary winding conventionally leading to the destination unit. Another known arrangement simply bridges the transformer primary winding across the two wires of a pair.

In either of the tapping arrangements referred to in the foregoing the problem of proper termination is encountered. When binary signals of extremely high frequency and/or fast rise time are transmitted, reflections due to improper impedance matching at the branch taps of sufficient magnitude may develop to produce false logic and data signal levels. In the shunt tap arrangement, for example, the shunting impedance must be much greater than the characteristic impedance of the transmission line to avoid reflections; in the series tap, the series impedance must be much lower. In either case, the amount of tapped power must be compromised with the degree of impedance mismatch introduced. In addition, the efficiency of a plurality of branching taps employing either a series or shunt arrangement is low. The power continuing down the two-wire pair is reduced by an amount greater than that of the power extracted at the tap, the difference power returning toward the source as a reflection. Where a number of branches are required, the amount of signal power available at each is thus very small. As a result, an amplifying stage is normally required to regenerate the output signal to a useable logic or information level with an unavoidable introduction of a propagation time delay. This delay when added to the delay introduced into the two-wire pair by prior art transformer coupling arrangements frequently is critical in maintaining the necessary time relationships among the information signals being transmitted.

It is an object of this invention to provide a more efficient inductive coupling circuit for two-wire transmission lines.

It is also an object of this invention to provide a new and novel impedance matching transformer arrangement for coupling to a two-wire transmission line.

Another object of this invention is a transmission line system providing for a maximum transfer of power to a plurality of branching taps.

A further object of this invention is the achievement, in connection with transmission line transformer taps, of design freedom hitherto unavailable permitting impedance matching concurrently with a free choice of both the output tap impedance or voltage level and the fractional transmission line power to be removed by the tap.

SUMMARY OF THE INVENTION

The foregoing and other objects of this invention are realized in one illustrative embodiment thereof comprising a transformer having its primary winding connected both serially and in shunt in a two-wire transmission line. Viewed from the direction of signal travel, two end sections of the primary winding are serially connected respectively in the two wires of a preceding segment of the line, a midsection of the primary winding being bridged across the two wires of a succeeding segment of the line. The secondary winding, which may advantageously lead to a branching transmission line or to a functional unit of the system, is inductively coupled to the entire primary winding, including both end sections.

In accordance with the principles of this invention, the transmission line always sees an impedance match at the branching tap with the result that no power is lost due to reflections back along the line. It is thus one feature of this invention that each of a plurality of taps along a transmission line may receive the same fraction of the power remaining from a preceding transfer of power. Although each succeeding tap has available progressively less power, the efficiency of this arrangement is substantially greater than either the all serial or the all shunt tap transformers since in neither case is an impedance match completely possible to avoid perturbations on the transmission line.

According to another feature of this invention, a maximum in power transfer efficiency may be obtained in a transmission line having a plurality of branching taps in which the turns ratios of the successive transformers are adjusted so that the output voltage is the same for each tap. In this arrangement, the ratio of the number of turns of the midsection of the primary winding relative to the number of turns of the equal end sections and the number of turns of the secondary winding decreases progressively at succeeding tap points. In the final transformer, the primary winding midsection reduces to zero turns; in effect, constituting the winding a simple shunt connection across the two wires of the line. Manifestly, the turns ratios may be adjusted to extract any desired fraction of the line power.

It is also a feature of this invention that, because of the high coupling efficiency referred to in the foregoing, the need for signal amplification at the branching tap point is obviated in most applications. An attendant advantage arises from this feature in the introduction of very little delay, that of the transformer only, in the transmission of signals from the transmission line to the branch line or functional unit.

Another and substantial advantage offered by the transmission line coupling arrangement of this invention is the fact that a signal on the line is coupled to the segment of the line succeeding a tap even before complete transformer action takes place. As a result, the delay inserted into the line itself is typically an order of magnitude less than that for the signal coming from the tap. The importance of a negligibly short delay inserted at each tap will be appreciated from the fact that a number of such delays occur in tandem along the main critical path.

According to another feature of this invention, coupling circuits are provided for achieving a series of tap points to a transmission line making possible a totally independent design choice of the fractional tap-out power, the voltage or impedance level at the tap, and the input impedance level. At each tap point of the iterative coupling arrangement, therefore, the input impedance may be suitably chosen to achieve an impedance match to the transmission line for any desired choice of the other two mentioned variables.

BRIEF DESCRIPTION OF THE DRAWING

The foregoing and other objects and features of this invention will be better understood from a consideration of the detailed description of illustrative embodiments thereof which follow when taken in conjunction with the accompanying drawing in which.

DETAILED DESCRIPTION

Figure 1:
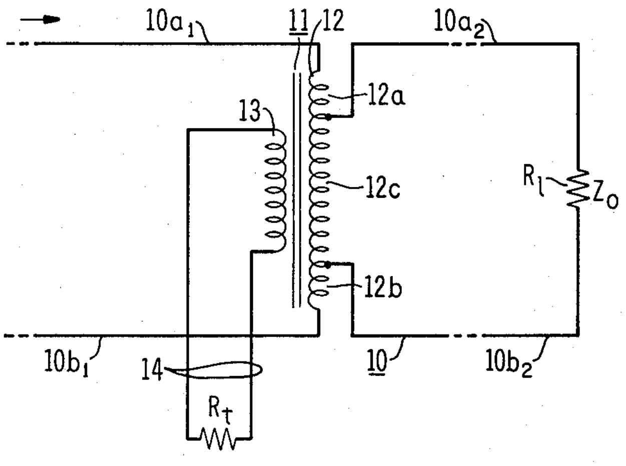
FIG. 1 depicts in schematic form a single stage branching tap circuit according to this invention for extracting signals from a two-wire transmission line, a portion of which is shown.

In FIG. 1 is shown a portion of a transmission line 10 comprising a pair of conductors which for convenience of description only may be regarded as being presenting two segments $10a_1$–$10b_1$ and $10a_2$–$10b_2$. The line 10 is shown as unconnected to any source since the origin of signals carried by the line is not essential to an understanding of this invention. Coupling the two segments of the transmission line 10 and providing the means for extracting signals therefrom in accordance with this invention is a transformer 11 having a primary winding 12 and a secondary winding 13. The primary winding 12 is bridged across the ends of the conductor segments $10a_1$ and $10b_1$ and the secondary winding 13 connects via a branching conductor pair 14 to a load $R_t$, which load is representative of the impedance of the functional unit of the system with which the line 10 is adapted for use; the load $R_t$ may otherwise represent the characteristic impedance of a branching transmission line of the system. The conductor pair segments $10a_2$ and $10b_2$ continue the line 10 from the transformer 11 by connections to taps on the primary winding 12 in a manner to divide the latter winding into two end sections 12*a* and 12*b* each having $n_1$ turns and a midsection 12*c* having $n_2$ turns.

The line 10 is terminated in its characteristic impedance $Z_o$ represented by the resistor $R_l$ connected across the other ends of the conductor pair segment $10a_2$ and $10b_2$. From the foregoing transformer 11 interconnections, it is apparent that sections of the primary winding 12 are serially connected in the line 10 and a section is connected in shunt in that line. How this novel serial-shunt connection to the transmission line 10 of the transformer 11 achieves the impedance matching function asserted may best be understood with reference to the resistive equivalent circuit of FIG. 2.

In that figure the resistive equivalents of the primary winding 12 end sections 12*a* and 12*b* of $n_1$ turns each serially connected in the transmission line 10 are represented by the serially connected resistances $R_1$, the midsection of $n_2$ turns being represented by the resistance $R_2$ shunted across the line, here represented by the conductors *la* and *lb*. The secondary winding, having $n_3$ turns, will be considered subsequently. As is the case in the circuit of FIG. 1, the characteristic impedance $Z_o$ represented by resistance $R_l$ terminates the line *la* and *lb*. In this discussion, it is assumed that the signal direction for both circuits is from left to right as viewed in the drawing and as indicated by directional arrow.

Figure 2:
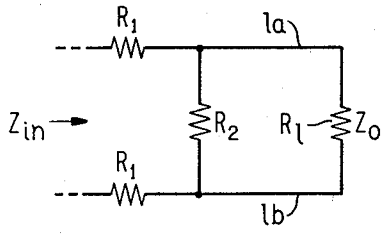
FIG. 2 depicts the resistive equivalent of the circuit of FIG. 1 for purposes of demonstrating the principles of this invention.

An impedance match for a signal in the circuit of FIG. 2 is obtained when $Z_{in} = Z_o$ where the relationship of the resistance values is such that $$Z_o = 2R_1 + \frac{R_2 Z_o}{R_2 + Z_o} \quad (1)$$

With $Z_o$ predetermined, this is one equation in two unknowns, $R_1$ and $R_2$. Therefore, within the constraints of the relationship, there exists a family of values for $R_1$ and $R_2$ all of which achieve an impedance match. The choice of a particular set of values determines the fraction of the incoming power which is dissipated in these resistances; the remainder continues down the transmission line. The resistances $R_1$ and $R_2$ may be realized by the transformer circuit of FIG. 1 in which the ratio of the turns $n_1{:}n_2$ determines the relationship of $R_1$ to $R_2$, and the ratio of the turns $n_3{:}n_2$ combined with the values of $R_t$ and $R_l$ determines the absolute values of $R_1$ and $R_2$.

As is well known, a resistance connected across one of the windings of an ideal transformer is seen at the terminals of another winding as modified in value by the square of the turns ratio of the windings. By the theory of superposition, a grouping of several resistances connected to various windings of a transformer may be viewed at the terminals of a particular winding as a corresponding grouping of independent parallel resistances having values translated according to the respective turns ratios. Consequently, the transformer circuit of FIG. 1 which has two resistances $R_t$ and $R_l$ may also be represented as shown in the equivalent circuit of FIG. 3.

In that figure, two parallel resistors having individual resistances $r_t$ and $r_l$ are shown connected across the two conductors *la* and *lb* of a portion of a transmission line. As a result of the transformer connections the resistances are modified by the square of the corresponding turns ratios thus:

$$r_t = R_t\left(\frac{2n_1+n_2}{n_3}\right)^2 \text{ and } r_l = R_l\left(\frac{2n_1+n_2}{n_2}\right)^2 \quad (2)$$

Figure 3:
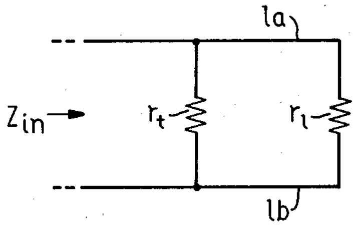
FIG. 3 depicts a more simplified resistive equivalent of the circuit of FIG. 1 included to further an understanding of the circuit analysis of this invention.

The power tapped from the transmission line in the transformer circuit of FIG. 1 is directed into $R_t$, and therefore corresponds to that dissipated in the left hand resistor of the equivalent circuit of FIG. 3. The power continuing down the line terminates in $R_l$ and therefore corresponds to that dissipated in the right hand resistor of FIG. 3.

With the constraint that the parallel combination of these resistances must equal $Z_o$, there exists a family of relative values in which the choice of a particular set determines the fraction of the incoming power which will be dissipated in the left hand resistance, i.e., the tap-out power, the remainder going into the right hand resistor. The equivalent circuit of FIG. 2, which accurately depicts the manner in which impedances are reflected into a transmission line circuit by the transformer arrangement of FIG. 1, is thus reduced to a simpler equivalent circuit in FIG. 3 from which the design choice of parameters is readily apparent.

Referring to that figure, the constraint for an impedance match as mentioned in the foregoing is stated in the relationship $$Z_o = R_t\left(\frac{2n_1+n_2}{n_3}\right)^2 \text{ in parallel with } R_l\left(\frac{2n_1+n_2}{n_2}\right) \quad (3)$$

$$Z_o = \frac{R_t\left(\frac{2n_1+n_2}{n_3}\right)^2 \times R_l\left(\frac{2n_1+n_2}{n_3}\right)^2}{R_t\left(\frac{2n_1+n_2}{n_3}\right)^2 + R_l\left(\frac{2n_1+n_2}{n_2}\right)^2} \quad (4)$$

This relationship may be simplified by multiplying both numerator and denominator by the quantity $$\left(\frac{n_2 n_3}{2n_1+n_2}\right)^2$$

to obtain $$Z_o = \frac{R_t R_l (2n_1+n_2)^2}{R_t n_2^2 + R_l n_3^2} \quad (5)$$

Several of these parameters are predetermined in practice by design considerations as follows: As previously mentioned in connection with the circuit of FIG. 1, $R_l = Z_o$ when the circuit is used as a transmission line coupling device; $R_t$ is chosen according to the impedance or voltage level desired at the tap; the number of turns on one of the windings (for example, $n_3$) is selected in accordance with the frequency range of the signal being transmitted. As a result, there remain two unknowns, $n_1$ and $n_2$, in an equation which embodies the restraint of impedance matching.

In the case of two parallel resistors as in FIG. 3, assuming an input current $I_{in}$, the voltage across each will be the same. As a result, the fraction of the total input power which is dissipated in each is proportional to the current in each. Thus, for the resistor having the value $r_t$, $$\frac{I_t}{I_{in}} = \frac{r_l}{r_t + r_l} \quad (6)$$

where $I_t$ is the current in resistor $r_t$. The fraction of the input power dissipated in resistor $r_t$, consequently, is given by $$\frac{Pr_t}{P_{in}} = \frac{I_t}{I_{in}} = \frac{r_l}{r_t + r_l} \quad (7)$$

Substituting from relationships (2) for the resistances of FIG. 3, relationship (7) may be written:

$$\frac{Pr_t}{P_{in}}=\frac{R_1\left(\frac{2n_1+n_2}{n_2}\right)^2}{R_t\left(\frac{2n_1+n_2}{n_3}\right)^2+R_1\left(\frac{2n_1+n_2}{n_2}\right)^2} \quad (8)$$

Multiplying the numerator and denominator of Equation 8 by the quantity $$\left(\frac{n_2n_3}{2n_1+n_2}\right)^2$$

gives $$\frac{PR_t}{P_{in}}=\frac{R_1n_3^2}{R_tn_2^2+R_1n_3^2} \quad (9)$$

in which, as previously stated, the quantities $r$, $r_t$, $n_3$, and $PR_t/P_{in}$ are known, leaving only $n_2$ as an unknown for which the equation may readily be solved. Substituting this value in equation (5), all the parameters are determined.

It has thus been demonstrated in the foregoing that two independent equations result from this configuration, one embodying the impedance matching relationship and the other the fractional tap-out power relationship. It has further been shown that the value of $R_t$, the tap-out resistance, is an independently chosen parameter appearing in both equations. With $R_t$ freely chosen, the mathematical independence of the other two variables is thus shown to be available to the designer, and the simultaneous solution of these equations is shown to yield a unique design solution.

Figure 4:
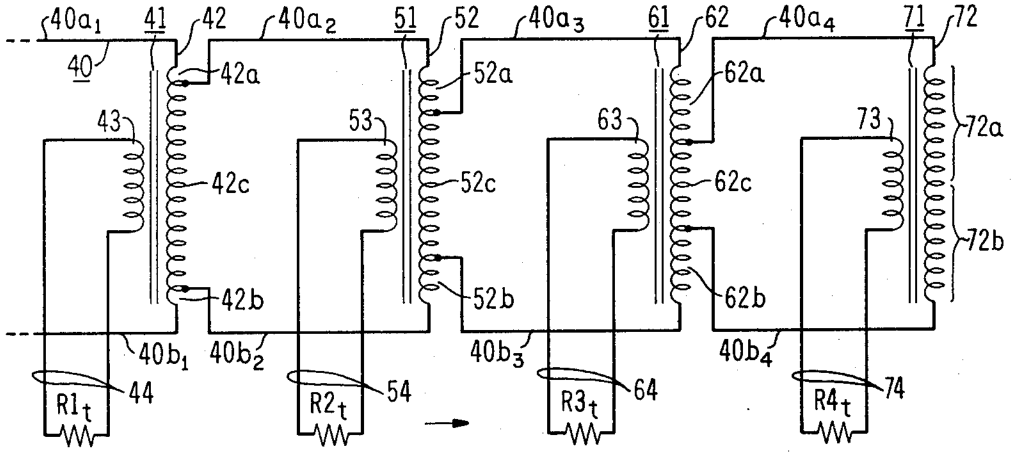
FIG. 4 depicts a terminating portion of a transmission line having a plurality of branching tap circuits according to one aspect of this invention.

The optimum in signal distribution efficiency is advantageously obtainable in a transmission line in accordance with another aspect of this invention in which the turns ratios of successive coupling transformers are adjusted so that the output voltage derived from each is the same. Such an arrangement is shown in FIG. 4 as comprising a two-conductor transmission line 40 which may be regarded as divided into a plurality of segments $40a_1$ – $40b_1$ through $40a_4$ – $40b_4$ by the branching points. The origin of the line 40 is not considered a part of this invention and accordingly is not included in FIG. 4, only a terminal portion of the line 40 incorporating the principles of this invention being shown. Four branches including a terminal branch are included in the line 40 each comprising a transformer arrangement as described in connection with the embodiment of FIG. 1. Assuming a signal transmission direction from left to right as viewed in the drawing and as indicated by the directional arrow, a first transformer 41 having a primary winding 42 and a secondary winding 43 provides a first branching point for a branch circuit pair 44 terminating in a load $R1_t$. Similarly, subsequent branching points are provided by transformers 51 and 61 having primary and secondary windings 52–53 and 62–63, for branch circuit pairs 54 and 64 terminating in loads $R2_t$ and $R3_t$, respectively. The transmission line 40 is terminated in a branch provided by transformer 71 having a primary and a secondary winding 72 and 73, respectively, the latter winding being coupled to branch circuit pair 74 in turn terminating in a load $R4_t$. The loads $R1_t$ – $R4_t$ are representative of the impedances of the functional units of the system with which the line 40 is adapted for use, or the loads may represent the characteristic impedances of the branching transmission lines of the system.

As was the case in connection with the transformer 11 of FIG. 1, each of the primary windings 42, 52, and 62 is tapped to provide connections for the subsequent segments of the line 40 thereby dividing the primary winding into two equal-turn end sections and a midsection. For example, the primary winding 42 of transformer 41 is divided into end sections 42*a* and 42*b* and a midsection 42*c* by the taps providing connections for the line segment $40a_2$ – $40b_2$. In a like manner the primary windings of the transformers 51 and 61 are divided into end sections 52*a* – 52*b* and 62*a* – 62*b*, and midsections 52*c* and 62*c*, respectively, to carry out the series-shunt interconnection of the primary windings with the transmission line 40 contemplated in accordance with this invention. The equal turn secondary windings 43, 53, and 63 are coupled to all of the turns of their associated primary windings. The primary winding 72 of the terminal transformer 71 presents a special case of the transformer arrangement according to this invention in which the number of turns of the midsection is reduced to zero, all of the turns now constituting the end sections 72*a* and 72*b* to which the secondary winding 73, of equal turns with the windings 43 – 63, is coupled.

It is apparent that, as the successive branches draw their share of power from the transmission line 40, less total power is successively available. Accordingly, in order for each of the branches to receive the same output voltage from the line, the first transformer 41 taps out the least fraction of the power available on the line at that point, the transformer 51 taps out a larger fraction of the power available, the transformer 61 taps out a still larger fraction, until, finally, the terminal transformer 71 taps out all of the remaining power. The fraction of the available power which is tapped out at each branch point is readily determined by adjusting the turns ratios of the end sections of the primary windings of the transformers 41, 51, 61, and 71, with respect to the respective midsections of the same windings. Although a requirement for equal output voltages at the branching circuits was assumed in the foregoing, it will be appreciated that the fraction of available power may be adjusted at the branching points to obtain various voltage levels simply by determining the turns ratios of secondary windings relative to those of the primary windings.

In the practice of this invention, unipolar pulses of short duration, e.g., 50 nanoseconds, were transmitted along a line and tapped therefrom by means of the transformer arrangements described in the foregoing. However, other signal waveforms may be transmitted and tapped with equal advantage. Thus, the transformer arrangements according to this invention are equally suited to the transmission of alternating current or modulated carrier signals, for example.

What have been described are considered to be only illustrative embodiments of the present invention and it is to be understood that various and numerous other arrangements may be devised by one skilled in the art without departing from the spirit of the invention as defined by the accompanying claims.

I claim:

1. A transmission line comprising a plurality of successive two-wire segments and a plurality of coupling circuits for connecting said segments, each of said coupling circuits comprising a primary winding connected across the terminating ends of a preceding one of said plurality of segments, the originating end of a succeeding one of said plurality of segments being connected to predetermined points on said primary winding to define two equal turn end sections and a midsection thereon, and a secondary winding inductively coupled to said primary winding including said end sections.

2. A transmission line according to claim 1 in which said midsections of said primary windings are coupled respectively to said secondary windings in successively decreasing turns ratios.

3. A transmission line according to claim 1 in which the number of turns of said midsections of said primary windings successively decreases with respect to the number of turns of said end sections of the same primary winding.

4. A transmission line according to claim 3 also comprising a load impedance connected across each of said secondary windings.

5. A transmission line according to claim 4 in which the turns ratios of said primary windings and said secondary windings of all of said coupling circuits are such that the amount of power available to said load impedances is equal when a signal appears on said transmission line.

6. A transmission line according to claim 4 in which the number of turns of the midsection of the primary winding connected across the terminating ends of the last of said successive twoswire segments is reduced to zero whereby substantially all of the signal power is applied to said load impedances when a signal appears on said transmission line.

7. A transmission line comprising a first and a second conductor, a plurality of corresponding series inductor windings in each of said conductors, a plurality of shunt inductor windings connected between said conductors at corresponding sides of each of said series inductor windings to form a plurality of series-shunt primary transformer windings, and a plurality of secondary transformer windings inductively coupled respectively to said plurality of series-shunt primary transformer windings.

8. A transmission line as claimed in claim 7 in which said shunt inductor windings have a successively decreasing number of turns with respect to said secondary transformer windings.

9. An electrical transmission line comprising a pair of conductors and a plurality of transformers each having a primary and a secondary winding, each of said primary windings having a pair of end sections serially connected respectively in said pair of conductors and a midsection connected in parallel across said pair of conductors.

10. An electrical transmission line as claimed in claim 9 in which the number of turns of one end section of a primary winding of each of said transformers is equal to the number of turns of the other end section of a primary winding of the same transformer and the number of turns of the midsections of the primary windings of said transformers progressively decreases with respect to the number of turns of said end sections of said primary windings.

11. An electrical transmission line as claimed in claim 10 also comprising a branch circuit connected to each of said secondary windings.

12. An electrical signal coupling circuit comprising a transmission line having the characteristics of inherent shunt capacitance and series inductance per unit length whose values determine an inherent propagation velocity thereon, said line being adapted to carry only signals whose wave lengths as controlled by said velocity are short relative to the length of said line, said line having a first and a second two-wire segment, a continuous primary transformer winding, means for applying said signals to said primary winding comprising said first two-wire segment connected across all of the turns of said primary winding, means for coupling a predetermined portion of said signals along a continuation of said line comprising said second two-wire segment connected at one end across a midsection of said primary winding including less than all of the turns of said primary winding, and means for tapping the remaining portion of said signals from said line comprising a secondary winding coupled to all of the turns of said primary winding.

13. An electrical signal coupling circuit according to claim 12 also comprising a transformer terminating circuit having a primary winding connected across the other end of said second two-wire segment and a secondary winding coupled to said last-mentioned primary winding.

* * * * *

UNITED STATES PATENT OFFICE
CERTIFICATE OF CORRECTION

Patent No. 3,673,519 Dated June 27, 1972

Inventor(s) Gilbert A. Van Dine

It is certified that error appears in the above-identified patent and that said Letters Patent are hereby corrected as shown below:

Column 3, line 8, delete "being". Column 4, equation (2), in the right-hand expression, "$r_1$" should read --$r_\ell$-- and "$R_1$" should read --$R_\ell$--. Column 4, equation (3), in the right-hand expression, "$R_1$" should read --$R_\ell$-- and the fraction should be squared so that the right-hand expression reads:

$$R_\ell\left(\frac{2n_1 + n_2}{n_2}\right)^2$$

Column 4, equation (4), the "$R_1$" in both the numerator and denominator of the right-hand fraction should read --$R_\ell$-- and the "$n_3$" in the numerator of the same fraction should read --$n_2$-- so that the right-hand expression reads:

$$\frac{R_\ell\left(\frac{2n_1 + n_2}{n_2}\right)^2}{R_\ell\left(\frac{2n_1 + n_2}{n_2}\right)^2}$$

Column 4, equation (5), the "$R_1$" in both the numerator and denominator should read --$R_\ell$--. Column 4, equation (6), the "$r_1$" in both the numerator and denominator of the right-hand fraction should read --$r_\ell$--.

ORM PO-1050 (10-69)

USCOMM-DC 60376-P69
☆ U.S. GOVERNMENT PRINTING OFFICE : 1969 O—366-334

UNITED STATES PATENT OFFICE
CERTIFICATE OF CORRECTION

Patent No. 3,673,519 Dated June 27, 1972

Inventor(s) Gilbert A. Van Dine

It is certified that error appears in the above-identified patent and that said Letters Patent are hereby corrected as shown below:

Column 4, equation (7), the "$r_1$" in both the numerator and denominator of the right-hand fraction should read --$r_\ell$--. Column 5, equation (8), the "$R_1$" in the numerator of the right-hand fraction should read --R$\ell$--(not sub-"$\ell$") and the "$R_1$" in the denominator of the same fraction should read --$R_\ell$-- (sub-"$\ell$"). Column 5, equation (9), the "$R_1$" in both the numerator and denominator of the right-hand fraction should read --$R_\ell$--. Column 5, line 19, "r" should read --$R_\ell$-- and "$r_t$" should read --$R_t$--. Column 7, line 2, "twoswire" should read --two-wire--.

Signed and sealed this 6th day of February 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
* U.S. GOVERNMENT PRINTING OFFICE : 1969 O—366-334